United States Patent
Lutz et al.

(10) Patent No.: US 6,953,219 B2
(45) Date of Patent: Oct. 11, 2005

(54) REINFORCING MEMBERS

(75) Inventors: Jean-Philippe Lutz, Strasbourg (FR); Serge Bieber, Haegen (FR); Eric Le Le Gall, Strasbourg (FR); Jean-Philippe Bourdin, Obernai (FR)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/742,530

(22) Filed: Dec. 19, 2003

(65) Prior Publication Data

US 2004/0164588 A1 Aug. 26, 2004

(30) Foreign Application Priority Data

Jan. 6, 2003 (GB) .............................................. 0300159

(51) Int. Cl.$^7$ ............................................. B62D 25/04
(52) U.S. Cl. ........................... 296/187.02; 296/193.06; 296/202
(58) Field of Search ....................... 296/187.02, 193.06, 296/202

(56) References Cited

U.S. PATENT DOCUMENTS

| | | |
|---|---|---|
| 3,162,086 A | 12/1964 | Wells |
| 3,400,182 A | 9/1968 | Kolt |
| 4,128,069 A | 12/1978 | Kotcharian |
| 4,463,870 A | 8/1984 | Coburn, Jr. et al. |
| 4,610,836 A | 9/1986 | Wycech |
| 4,751,249 A | 6/1988 | Wycech |
| 4,769,391 A | 9/1988 | Wycech |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,863,327 A * | 9/1989 | Poupiter ..................... 411/112 |
| 4,901,395 A | 2/1990 | Semrau |
| 4,923,902 A | 5/1990 | Wycech |
| 4,978,562 A | 12/1990 | Wycech |
| 5,124,186 A | 6/1992 | Wycech |
| 5,160,465 A | 11/1992 | Soderberg |
| 5,344,208 A | 9/1994 | Bien et al. |
| 5,358,397 A | 10/1994 | Ligon et al. |
| 5,506,025 A | 4/1996 | Otto et al. |
| 5,631,027 A | 5/1997 | Takabatake |
| 5,642,914 A | 7/1997 | Takabatake |
| 5,678,826 A | 10/1997 | Miller |
| 5,725,272 A | 3/1998 | Jones |
| 5,755,486 A | 5/1998 | Wycech |
| 5,806,915 A | 9/1998 | Takabatake |
| 5,829,482 A | 11/1998 | Takabatake |
| 5,888,600 A | 3/1999 | Wycech |

(Continued)

FOREIGN PATENT DOCUMENTS

| | | |
|---|---|---|
| DE | 2919046 | 11/1980 |
| DE | 19644047 A1 | 5/1998 |

(Continued)

OTHER PUBLICATIONS

Copending U.S. Appl. No. 09/631,211 filed Aug. 3, 2000.
Copending U.S. Appl. No. 10/646,439 filed Aug. 21, 2003.

(Continued)

*Primary Examiner*—Dennis H. Pedder
(74) *Attorney, Agent, or Firm*—Dobrusin & Thennisch PC (57) ABSTRACT

Parts are provided which combine structural reinforcement of hollow profiles and light weight means of attachment. Optionally, the part may also provide an acoustic baffle. The parts consists of a core coated with expandable structural reinforcing foam on at least part of its surface the core being provided with means for receipt of a nut and means to prevent rotation of the nut. Optionally, a piece of a second expandable material is provided on at least one extremity which can expand to fill the entire cross section of the hollow profile. In a preferred embodiment, the hollow profile is the A, B or C pillar of a vehicle and the nut is used for attaching doors.

21 Claims, 3 Drawing Sheets

U.S. PATENT DOCUMENTS

| | | |
|---|---|---|
| 5,906,410 A | 5/1999 | Dalinkiewicz |
| 5,931,474 A | 8/1999 | Chang et al. |
| 5,937,486 A | 8/1999 | Bockenheimer |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,068,424 A | 5/2000 | Wycech |
| 6,092,864 A | 7/2000 | Wycech et al. |
| 6,096,403 A | 8/2000 | Wycech |
| 6,099,948 A | 8/2000 | Paver, Jr. |
| 6,103,341 A | 8/2000 | Barz et al. |
| 6,129,410 A | 10/2000 | Kosaraju et al. |
| 6,131,897 A | 10/2000 | Barz et al. |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche |
| 6,199,940 B1 | 3/2001 | Hopton et al. |
| 6,207,244 B1 | 3/2001 | Hesch |
| 6,233,826 B1 | 5/2001 | Wycech |
| 6,237,304 B1 | 5/2001 | Wycech |
| 6,244,601 B1 | 6/2001 | Buchholz et al. |
| 6,247,287 B1 | 6/2001 | Takabatake |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,347,799 B1 | 2/2002 | Williams et al. |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| 6,378,933 B1 * | 4/2002 | Schoen et al. ......... 296/187.02 |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| 6,435,601 B2 | 8/2002 | Takahara |
| H2047 H | 9/2002 | Harrison et al. |
| 6,444,713 B1 | 9/2002 | Pachi et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,550,847 B2 | 4/2003 | Honda et al. |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,619,727 B1 | 9/2003 | Barz et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,691,468 B2 | 2/2004 | Helferty |
| 6,692,347 B1 | 2/2004 | Schneider |
| 6,708,979 B2 | 3/2004 | Stratman et al. |
| 6,729,425 B2 | 5/2004 | Schneider |
| 6,733,040 B1 | 5/2004 | Simboli |
| 6,748,667 B2 | 6/2004 | Sevastian |
| 6,777,049 B2 | 8/2004 | Sheldon et al. |
| 6,786,533 B2 | 9/2004 | Bock et al. |
| 6,793,274 B2 | 9/2004 | Riley et al. |
| 6,811,864 B2 | 11/2004 | Czaplicki et al. |
| 6,817,654 B2 | 11/2004 | Kitagawa et al. |
| 6,820,923 B1 | 11/2004 | Bock |
| 2001/0020794 A1 | 9/2001 | Ishikawa |
| 2001/0042353 A1 | 11/2001 | Honda et al. |
| 2002/0053179 A1 | 5/2002 | Wycech |
| 2002/0074827 A1 | 6/2002 | Fitzgerald et al. |
| 2002/0160130 A1 | 10/2002 | Sheldon et al. |
| 2002/0164450 A1 | 11/2002 | Lupini et al. |
| 2002/0174954 A1 | 11/2002 | Busseuil et al. |
| 2003/0001469 A1 | 1/2003 | Hankins et al. |
| 2003/0039792 A1 | 2/2003 | Hable et al. |
| 2003/0042056 A1 | 3/2003 | Schneider et al. |
| 2003/0050352 A1 | 3/2003 | Guenther et al. |
| 2003/0057737 A1 | 3/2003 | Bock et al. |
| 2003/0069335 A1 | 4/2003 | Czaplicki et al. |
| 2003/0090129 A1 | 5/2003 | Riley et al. |
| 2003/0140671 A1 | 7/2003 | Lande et al. |
| 2003/0144409 A1 | 7/2003 | Kassa et al. |
| 2003/0176128 A1 | 9/2003 | Czaplicki et al. |
| 2003/0183317 A1 | 10/2003 | Czaplicki et al. |
| 2003/0184121 A1 | 10/2003 | Czaplicki et al. |
| 2003/0186049 A1 | 10/2003 | Czaplicki et al. |
| 2003/0201572 A1 | 10/2003 | Coon et al. |
| 2003/0218019 A1 | 11/2003 | Le Gall et al. |
| 2004/0011282 A1 | 1/2004 | Myers et al. |
| 2004/0018341 A1 | 1/2004 | Richardson et al. |
| 2004/0018353 A1 | 1/2004 | Czaplicki et al. |
| 2004/0031164 A1 | 2/2004 | Sevastian |
| 2004/0033344 A1 | 2/2004 | Czaplicki et al. |
| 2004/0034982 A1 | 2/2004 | Wieber et al. |
| 2004/0046423 A1 | 3/2004 | Wieber |
| 2004/0051251 A1 | 3/2004 | Hankins et al. |
| 2004/0056472 A1 | 3/2004 | Schneider |
| 2004/0074150 A1 | 4/2004 | Wycech |
| 2004/0075299 A1 | 4/2004 | Wieber et al. |
| 2004/0076831 A1 | 4/2004 | Hable |
| 2004/0079478 A1 | 4/2004 | Merz |
| 2004/0135058 A1 | 7/2004 | Wycech |

FOREIGN PATENT DOCUMENTS

| | | |
|---|---|---|
| DE | 19812288 C1 | 5/1999 |
| DE | 19856255 C1 | 1/2000 |
| DE | 19858903 A1 | 6/2000 |
| EP | 0 383 498 A2 | 8/1990 |
| EP | 0611778 B1 | 9/1997 |
| EP | 0 834 442 A2 | 4/1998 |
| EP | 0891918 A1 | 1/1999 |
| EP | 0893331 A1 | 1/1999 |
| EP | 0893332 A1 | 1/1999 |

| | | |
|---|---|---|
| EP | 1006022 A2 | 6/2000 |
| EP | 1122152 A2 | 8/2001 |
| EP | 1122156 A2 | 8/2001 |
| EP | 0893332 B1 | 3/2002 |
| EP | 1256512 A2 | 11/2002 |
| EP | 1 440 867 A1 | 1/2003 |
| EP | 1006022 B1 | 9/2003 |
| EP | 1362683 A2 | 11/2003 |
| EP | 1362769 A1 | 11/2003 |
| EP | 1 241 365 B1 | 1/2004 |
| EP | 1 419 954 A2 | 5/2004 |
| EP | 1 428 744 | 6/2004 |
| EP | 1 475 295 A2 | 11/2004 |
| FR | 2749263 A1 | 12/1997 |
| GB | 2156412 A | 10/1985 |
| GB | 2375328 A | 11/2002 |
| JP | 10-45031 | 2/1998 |
| JP | 10053156 | 2/1998 |
| JP | 2000-52444 | 2/2000 |
| JP | 2001-62833 | 3/2001 |
| JP | 2001-88739 | 4/2001 |
| JP | 2001191949 A | 7/2001 |
| JP | 2001-199362 | 7/2001 |
| JP | 2002-120250 | 4/2002 |
| WO | WO 95/32110 | 11/1995 |
| WO | WO 97/02967 | 1/1997 |
| WO | WO 97/43501 | 11/1997 |
| WO | WO 98/36944 | 8/1998 |
| WO | WO 98/50221 | 11/1998 |
| WO | WO 99/08854 | 2/1999 |
| WO | WO 99/28575 | 6/1999 |
| WO | WO 99/48746 | 9/1999 |
| WO | WO 99/50057 | 10/1999 |
| WO | WO 00/13958 | 3/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 01/19667 A1 | 3/2001 |
| WO | WO 01/30906 A1 | 5/2001 |
| WO | WO 01/54936 | 8/2001 |
| WO | WO 01/58741 A1 | 8/2001 |
| WO | WO 01/71225 A1 | 9/2001 |
| WO | WO 01/83206 A1 | 11/2001 |
| WO | WO 01/88033 A1 | 11/2001 |
| WO | WO 03/042024 A1 | 5/2003 |
| WO | WO 03/051676 | 6/2003 |
| WO | WO 03/089221 A1 | 10/2003 |

OTHER PUBLICATIONS

Copending U.S. Appl. No. 10/686,845 filed Nov. 5, 2002.

Copending U.K. Application Serial No. 0220945.0 filed Sep. 10, 2002.

Klein, M. and Adam Opel AG, "Application of Structural Foam in the Body in White–Reinforcement Roof Rail Side of the OPEL ASTRA", VDI Berichte, pp. 227–249.

U.K. Search Report for Application No. GB 0300159.1 dated Oct. 27, 2003.

U.K. Search Report for Application No. GB 0300159.1 dated Mar. 21, 2003.

European Search Report dated Sep. 29, 2004 EP 03079010 (1001.098EP).

* cited by examiner

REINFORCING MEMBERS

CLAIM OF BENEFIT OF FILING DATE

The present application claims the benefit of the filing date of U.K. Application Serial No. 0300159.1 filed Jan. 6, 2003, hereby incorporated by reference.

FIELD OF INVENTION

The present invention relates to a means for providing structural reinforcement within hollow frames at positions where parts are attached to the hollow frames and is particularly concerned with such means which enable a significant reduction in the weight of the attachment means whilst increasing the overall strength of the structure. The invention is particularly useful with automobiles although it may be used in caravans, aircraft, boats, ships, construction and other similar applications.

BACKGROUND OF INVENTION

The attachment of a door to a pillar, such as the A pillar of an automobile provides a good example of the applicability of the present invention. The A pillar is typically a hollow metal frame and the door is attached to the outside of the frame with a nut and a heavy elongated bolt which extends across the cavity of the hollow frame to prevent the opposed surfaces of the frame collapsing inwards. These elongated bolts are extremely heavy and so, undesirably, add to the weight of the vehicle. They are also expensive.

It is known to provide structural reinforcement in hollow structures by the provision of a core of reinforcing material coated with foamable adhesive material within the hollow structure. The foamable material is then activated by heat, typically the temperature in the drying oven of the e-coat anti-corrosion coating process so that it foams to fill the space between the core of reinforcing material and the hollow structure. The foamed adhesive material will also bond the core to the internal surface of the hollow structure. It has been proposed that such reinforcing structures may be used around positions of attachment but it has been necessary to ensure that the reinforcing structure be such that it allows for passage of the attaching means such as a bolt through the structure.

SUMMARY OF THE INVENTION

We have now found that providing certain conditions are fulfilled a nut may be located within a structural reinforcing member allowing secure attachment to be achieved with use of a smaller and lighter bolt. The structural reinforcing member including the foam fills the hollow structure and prevents the opposing faces from collapsing, the function hitherto performed by the elongated bolt.

Accordingly, the present invention provides a structural reinforcing member comprising a core coated over part of its surface with an expandable material wherein the core is provided with means for receipt of a nut and means to prevent rotation of the nut and the location of the expandable material on the surface of the reinforcing member is such that expansion of the expandable material does not cause foam to cover a nut located within the means for receipt of a nut or any bolt attached to said nut.

In a further embodiment the invention can also provide sound insulation within the vehicle structure.

The present invention is particularly useful in the provision of reinforcement and optionally sound insulation in vehicle A and B pillars at the positions where the doors are attached to the pillars. Traditionally, doors have been attached to the pillars using extremely long and heavy nuts and bolts which also act as spacers between the two metal surfaces of the pillar. These make an undesirably high contribution to the weight of the vehicle. We have now found that, the rigid reinforcing member can act as the spacer between the metal surfaces and may also be provided with means for receiving the nut that is used for attachment of the door to the pillar. We have found that the expandable material allows a lighter weight means for securing and providing spacing which also provides adequate strength and reinforcement. For example, whilst the securing means may continue to be a nut and a bolt the bolt may be an integral part of the structural reinforcing member and it may be strengthened by the expanded material and the rigid reinforcing material to enable lighter weight bolts and/or materials to be used to produce attachments of comparable strength. Similarly, the securing means may be a nut and the invention enables the use of a lighter weight nut. The means within the reinforcing member that receives the nut is preferably a cavity, which is shaped both to receive a nut and prevent rotation of the nut. It is also important that after foaming the foam does not envelop the nut and/or bolt in order that the door can be removed and/or replaced.

In a preferred embodiment, the invention further provides a combined effect of structural reinforcement, improved lighter means of attachment together with a baffle providing for instance, sound insulation. In particular, the invention provides materials that can be installed in hollow cross-sectional members to provide reinforcement to improve the structural integrity of vehicles, to enable attachment of parts such as doors and to provide sound insulation against the noise of air currents. The invention is particularly concerned with the provision of such materials in the pillars of the main body of vehicles particularly at the bottom of the A pillar close to the lower door attachment where they provide the combined reinforcement and insulation effect with a simpler and lighter means of attaching the door to the pillar.

The invention further provides a system whereby these desirable properties can be provided in an automobile whilst ensuring effective provision of an anti-corrosion coating on the inner surface of the hollow cross-sectional member by the electrocoat process. The electrocoat process used in vehicle manufacture is a process in which the vehicle structure is passed through a bath of anticorrosion fluid and the vehicle structure is used as an electrode whereby an anticorrosion coating is deposited from the fluid onto the vehicle structure by electrolysis.

DETAILED DESCRIPTION OF THE INVENTION

The trends in motor vehicle design are towards lighter vehicles to improve fuel consumption. At the same time, the safety standards and requirements are becoming more rigorous as indicated by the European Union requirements and the Euro-NCAP impact testing. The use of lighter materials such as aluminum to produce the hollow cross-sectional members that are used as vehicle sub frames has lead to the need for additional reinforcement. There is a need for reinforcement in various locations in the vehicle structure including the sub frame and upper structure and the form of reinforcement required can vary from one location in the vehicle to another and from vehicle to vehicle. The present invention therefore reduces the weight of vehicle structures and at the same time improves the strength of the vehicle structure. In a preferred embodiment those effects are combined with the provision of improved sound insulation.

There are four main types of application where structural reinforcement is required in vehicles. Crash protection is one type where the prevention of vehicle body deformation is important to provide protection for the occupants. Energy absorption is another type employed to enhance performance after yield. The reduction of flexing or body movement in the vehicle structure particularly to improve durability and reduce stress cracking and the point mobility problems requiring the reduction of resonance by the provision of stiffening are other types.

It is known to provide foamable plastic mouldings within hollow cross sections of vehicles which can be foamed upon application of heat, such as in the baking step in the electrocoat process. In this way, a foamed baffle that fills the cross-section to provide sound adsorption can be produced. Such systems are described in European Patent Applications 0383498 and 0611778. The foamed baffle provides sound deadening and vibration resistance. In these systems the entire insert is foamable and it is proposed that the foamable material be chosen so that it will foam during the baking process which follows the electrocoat process typically used in vehicle manufacture to provide resistance to metal corrosion. Such materials may be combined with the structural reinforcing member of the present invention.

It is also known from WO01/83206 A to provide materials that have a combined reinforcing and sound deadening effect.

In a preferred embodiment, the present invention provides combined structural reinforcement and sound deadening for a hollow member comprising a rigid reinforcing member having a shape that substantially conforms to the cross section of the section of the hollow member to be reinforced having a first expandable adhesive material over at least a portion of the surface of said rigid reinforcing member said first expandable material forming a structural foam upon expansion which bonds the reinforcing member to at least part of the internal surface of the structure, said rigid reinforcing member having on at least one extremity a second expandable material. The second expandable material preferably expands at substantially the same temperature as the first expandable material to entirely fill the cross section of the hollow member beyond the extremity of the rigid reinforcing member to provide an acoustic baffle, the rigid reinforcing member being provided with means for receipt of a nut and means to prevent rotation of the nut, the first and second expandable material being such that when foamed the foam does not cover a nut located with the means for receipt of a nut or any bolt attached to said nut.

Accordingly, upon expansion of the two expandable materials used in the preferred embodiment of the invention, a unitary structure is formed within the hollow member comprising the rigid reinforcing member bonded at certain positions to the hollow profile member by the structural foam and further comprising a sound insulating foam baffle which entirely fills the cross section of the hollow profile member at least one extremity of the rigid reinforcing member, the foam being such that it does not impede access to the nut.

The dimensions of the rigid reinforcing member and the thickness and nature of the first expandable material are important to the achievement of the desired structural reinforcement. The exterior shape of the reinforcing member should conform substantially to the cross section of the section of the automotive structure it is designed to reinforce. The shape may vary along the length of the reinforcing member as the dimensions of the cross section of the structure change. The size of the reinforcing member including the first expandable adhesive material and any second expandable material that may be present should be such that there is a small clearance between the extremity of the reinforcing member and the interior walls of the frame of the vehicle to allow for passage of the electrocoat fluid during the e-coat anti-corrosion process. The reinforcing member preferably has a cellular, honeycomb or ribbed internal structure to provide reinforcement along several different axes.

When present, the size of the piece of the second expandable material that is provided at the extremity of the rigid reinforcing member should also be such that, in the unfoamed state, there is a clearance between the perimeter of the piece of second expandable material and the interior walls of the foam of the vehicle to allow for passage of the electrocoat fluid.

The structural reinforcing member is preferably provided with means for attachment to the interior walls of the frame of the vehicle. The means of attachment may be clips which fit into receptors in the frame of the vehicle or alternatively they may be receptors formed in the structural reinforcing member designed to receive clips from the frame of the vehicle. In addition or alternatively the reinforcing member may be provided with small lugs, which enable it to stand away from the interior walls of the sections of the vehicle. In this way, the need for fastening devices may be avoided and the area of contact between the structural reinforcing member and the interior walls of the frame of the vehicle may be minimized. The clearance between the extremity of the reinforcing member and the interior walls of the frame of the vehicle and between the piece of second expandable material, when present, and the interior walls of the frame of the vehicle should be wide enough to enable the liquid used in the electrocoat bath to flow between the reinforcing member and the interior walls of the sections of the vehicle in sufficient quantity to enable an effective anti-corrosion coating to be deposited. The clearance must not however be too wide since this can result in a lack of rigidity in the structure when the first expandable material is foamed to fill the clearance and bond the structural reinforcing member to the interior walls of the frame of the vehicle. We prefer that the clearance be no more than 1 centimeter and is more preferably 3 to 10 millimeters. Provision of a clearance around the whole structure enables a more uniform foam structure to be obtained.

The rigid reinforcing member may be made from any suitable material, for example it may be made of metal or plastic and the material will be chosen according to the preferred fabrication method. This, in turn, is driven by economics and the complexity of the cross section to be reinforced. Reinforcing members of simple cross sections may be prepared by extrusion whilst injection moulding may be required for more complex structures. Metal members may be produced by stamping and/or forming. Where extrusion is used the members may be of metal or thermoplastics;

where injection moulding is used thermoplastics are preferred. Polyamides, particularly glass filled polyamides are suitable materials for extrusion or injection moulding due to their high strength to weight ratio. Alternatively injection moulding or die casting of metal alloys may be employed. It is preferred that the moulding is provided with means enabling fluid drainage. For example, holes may be provided in the moulding to allow the drainage of water, which may condense in the structure over time.

The preferred shape and structure of the reinforcing member will depend upon where it is to be located in the vehicle structure, the reinforcing function it is to perform, the article to be attached and the means of attachment. The reinforcing effect may be to reduce point mobility such as for example at the base of side and rear pillars, this is particularly important with high-sided vehicles where the reinforcement can reduce or prevent vehicle sway thus reducing metal fatigue. Other parts of the vehicle which may be reinforced by the techniques of the present invention include roof structures, pillars, such as the A pillar, B pillar or C pillar. The invention is particularly concerned with parts which may be used to reinforce the base of A pillars and B pillars where the attachment may be used to attach doors and the like.

The first expandable adhesive material serves two main functions, it will expand to fill the space between the reinforcing member and the interior of the vehicle structure and it will also bond to the interior wall of the structure. Accordingly, expandable adhesive material means that the material can be activated to both expand (typically foam) and to act as an adhesive. Activation therefore enables the first expandable material to expand and fill a gap between the reinforcing member and the hollow structure it is designed to reinforce and to bond to the internal surface of the hollow structure. Accordingly, the first expandable adhesive must expand at the desired temperature and be sufficiently adhesive to firmly bond the reinforcing member inside the vehicle structure. Once foamed it should be sufficiently strong that it does not contribute any weakness to the overall reinforcing effect provided.

Prior to activation, the first expandable adhesive material is preferably dry and not tacky to the touch, since this facilitates shipping and handling and prevents contamination. Examples of preferred foamable materials include foamable epoxy-base resins and examples of such materials are the products L5206, L5207, L5208 and L5209, which are commercially available from L & L Products of Rome Mich. USA, and the Betacore Products BC 5204, 5206, 5205 and 5208 available from Core Products, Strasbourg, France. The product should be selected according to the rate of expansion and foam densities required. It is further preferred that the material expand at the temperatures experienced in the electrocoat baking oven, typically 130° C. to 150° C.

The first expandable adhesive material should be applied to at least a portion of the surface of the rigid reinforcing member that will be adjacent to an interior surface of the section of the vehicle frame that is to be reinforced. It is preferred that the foamable material be applied over at least part of all the surfaces of the reinforcing member that are adjacent to the interior surface of the vehicle section. The first expandable material may be applied to the rigid reinforcing member by bonding a strip of the material to the member, by extrusion coating or by injection moulding. Where the reinforcing member is made by injection moulding the expandable material may be applied by two shot injection moulding. The material should however be applied under conditions such that no foaming takes place.

The second expandable material, when used, serves a different function from the first expandable material in that it fills the entire cross section of the hollow profile member and provides sound insulation. Typical materials from which the second expandable material can be derived include ethylene unsaturated ester copolymers such as ethylene vinyl acetate copolymers and copolymers of ethylene and acrylic monomers such as acrylic acid, methyl acrylate, ethyl acrylate and butyl acrylate. Such polymers contain blowing agents to render them expandable and choice of the blowing agent and blowing agent initiator (sometimes known as a kicker) can determine the temperature at which expansion occurs. Accordingly although it is not essential that the second expandable material expand at the same temperature as the first expandable material the temperatures are preferably similar and preferably both within the range of temperatures experienced in the electrocoat oven, typically 130° C. to 150° C.

It is preferred that the reinforcing member coated with the first expandable material and optionally attached to the second expandable material is located within the hollow member that it is designed to reinforce in a manner that provides a clearance between the external surface of the coated member and the internal surface of the hollow member. This allows for the passage of the electrocoat fluid between the member and the internal surface and also enables a uniform expansion of the foam around the member to provide more uniform reinforcement. Accordingly, in a preferred process for providing reinforcement and sound deadening within hollow structures such as a vehicle frame, molded reinforcing members with the layer of first expandable material thereon and with the piece of second expandable material attached thereto are installed during assembly of the vehicle frame. A nut may then be placed in the means provided within the core for receipt of a nut. Locating lugs are preferably moulded on the reinforcing member or the expandable material so that the reinforcing member sits within the vehicle structure leaving a space between the member and the interior walls of the cavity to be reinforced, in this way the need for fastening or bonding means to attach the member to the interior walls can be avoided.

The assembled structure is then subjected to the electrocoat process in which it is passed through a bath of coating material and a corrosion resistant coating is deposited onto the structure by electrolysis. The vehicle structure is then dried in an oven to provide the final coating and the first and second expandable materials are preferably chosen so that they are activated and foam due to the drying conditions used in the oven employed to bake the coating on the electrocoat process. In this way the expandable materials will expand under the drying conditions to provide a first foam that fills the space between the rigid reinforcing member and the interior walls. The foam produces a strong bond between the reinforcing member and the interior wall. A second foam will be formed at the extremity of the reinforcing member that fills the entire cavity to provide a sound insulating baffle. Typically the coated structure is dried at around 165° C. for about 20 minutes and accordingly both the foamable materials preferably expand under these conditions. The industry is however looking to use lower drying temperatures and shorter drying times and this may influence the choice of expandable adhesive materials. Once the foaming has taken place and the foam is cured a body panel such as a door may be secured to the vehicle structure by means of a bolt mating with the nut already provided in the structural reinforcing member.

The techniques of the present invention may be used for the attachment of parts, reinforcement and optionally the provision of sound insulation in any construction that is based on a hollow frame structure. They may for instance be used in the construction industry, in boats, in aircraft, and in railroad applications. The techniques are however particularly useful to provide reinforcement in automobiles including cars, trucks, caravans and the like. The techniques are particularly useful in the current trend towards using lighter and sometimes weaker materials in the production of automobile sub frames where there is a greater need for reinforcement to compensate for the reduction in strength of the basic material and yet satisfy the safety requirements. This is particularly the case with the use of aluminum for the production of automobiles.

The invention is applicable to any instances where structural reinforcement is to be provided at positions whose parts are to be attached. For example in vehicles it is applicable for door attachments including hatchbacks, bonnet, boot and engine attachments. Similarly the invention is applicable to attachments in aircraft, railroad, ship and boat applications.

Figure 1:
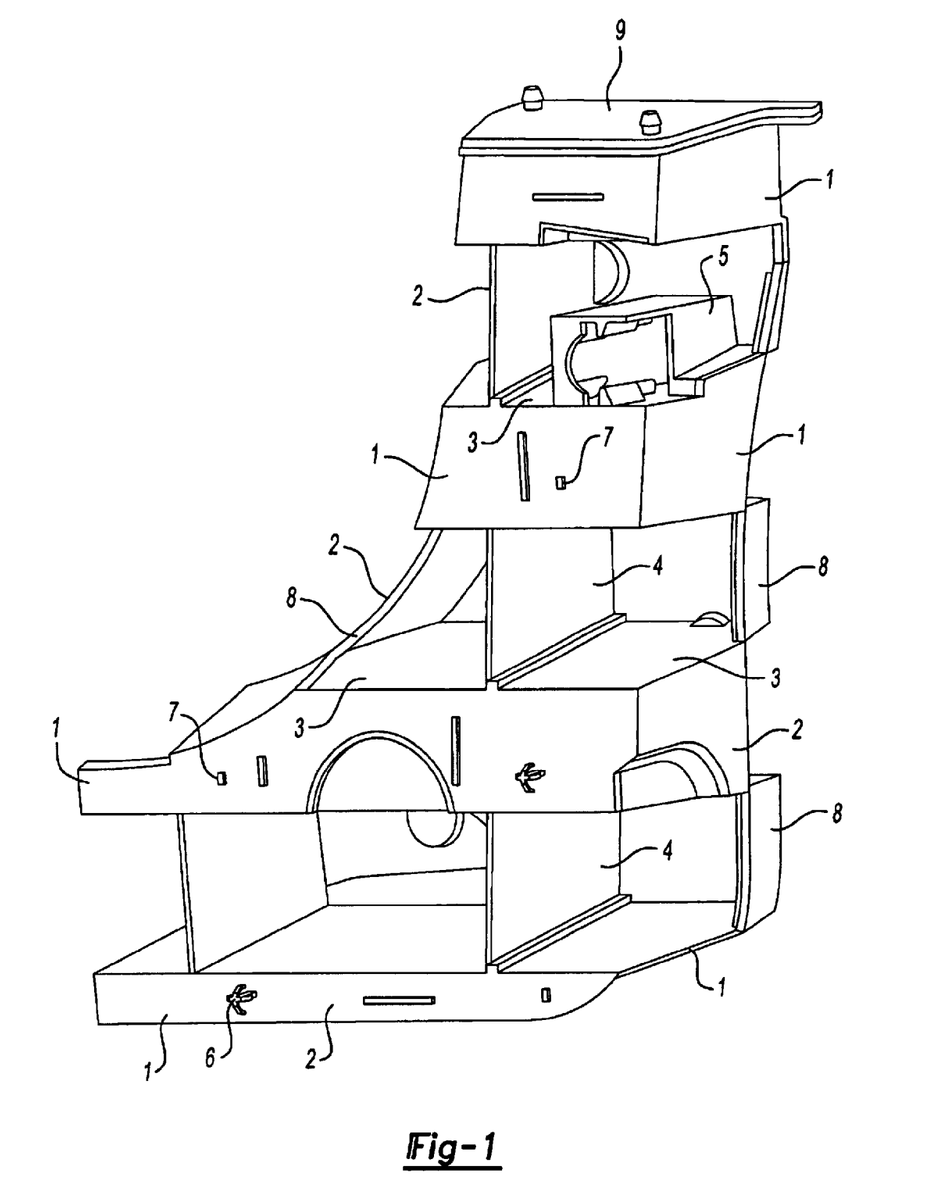
FIG. 1 shows a multisectional profiled member according to an exemplary embodiment of the present invention.
Figure 3:
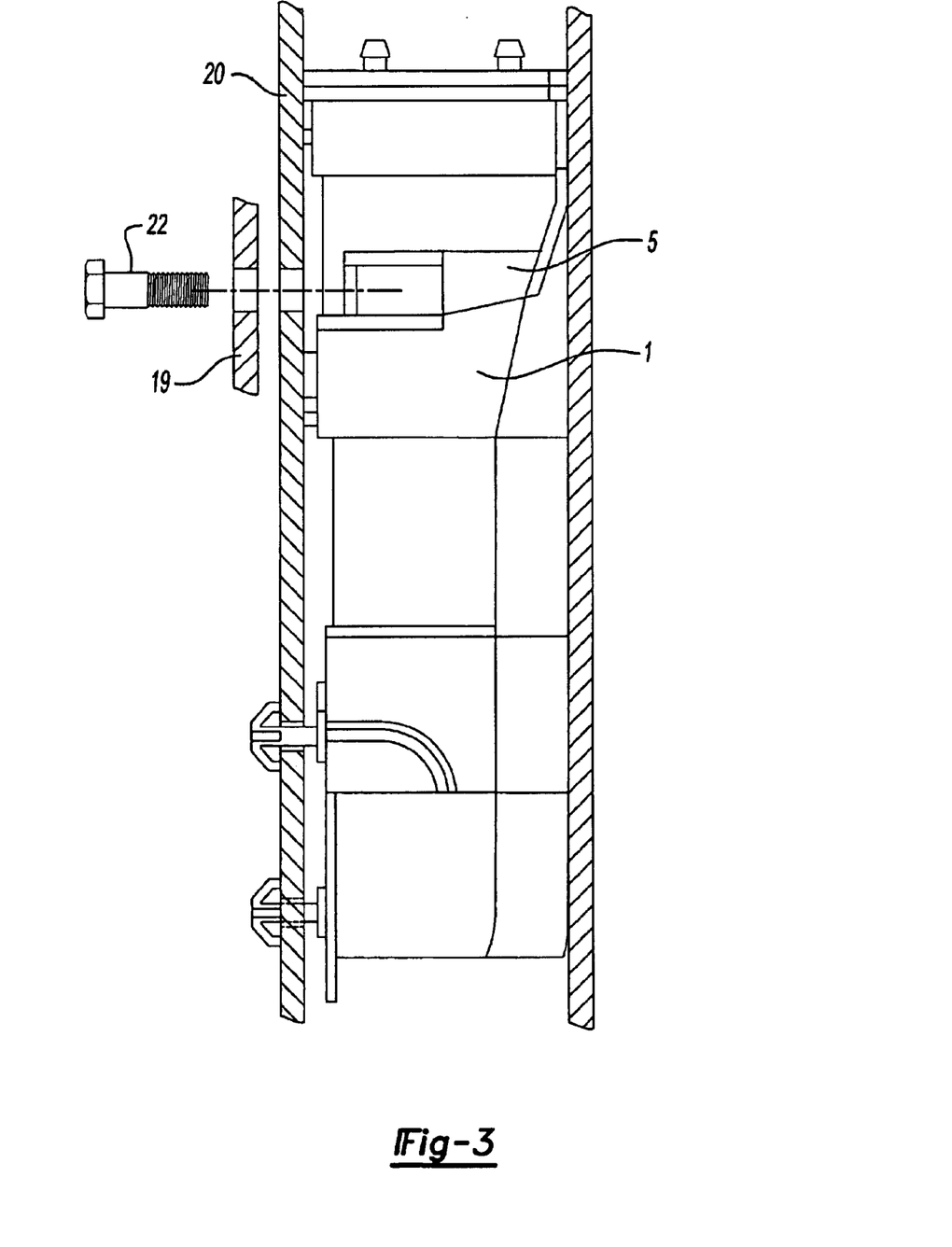
FIG. 3 shows the exemplary multisectional profiled member of FIG. 1 located within an exemplary structure of an article of manufacture.

The present invention is illustrated by the accompanying drawings in which FIG. 1 shows a multisectional profiled member (1) whose exterior profile matches the profile of the base of an A pillar of a vehicle. The member (1) comprises an outer surface (2) and vertical and horizontal ribs (3) and (4) are provided to impart improved structural reinforcement. The member (1) is also provided with cavity means (5) for the receipt of a nut to, as shown in FIG. 3, enable the door (19) to be attached to the pillar (20), the cavity (5) is such that a nut for receipt of the bolt (22) used to attach the door can be slid into the cavity. The cavity is provided with arms which hold the nut in pace. The cavity is also provided with a square or rectangular slot into which the base of the nut can be fitted in a manner that prevents rotation of the nut. Clips (6) are provided for attaching the profiled member (1) to the inner surface of the A pillar. Spacers (7) are also provided to hold the member (1) away from the pillar until foaming has taken place.

The member (1) is also provided with a first expandable adhesive material at various positions (8) on its surface.

A piece of second expandable material (9) is provided across the entire upper surface of the profiled member (1) which can be expanded to produce an acoustic baffle.

Figure 2:
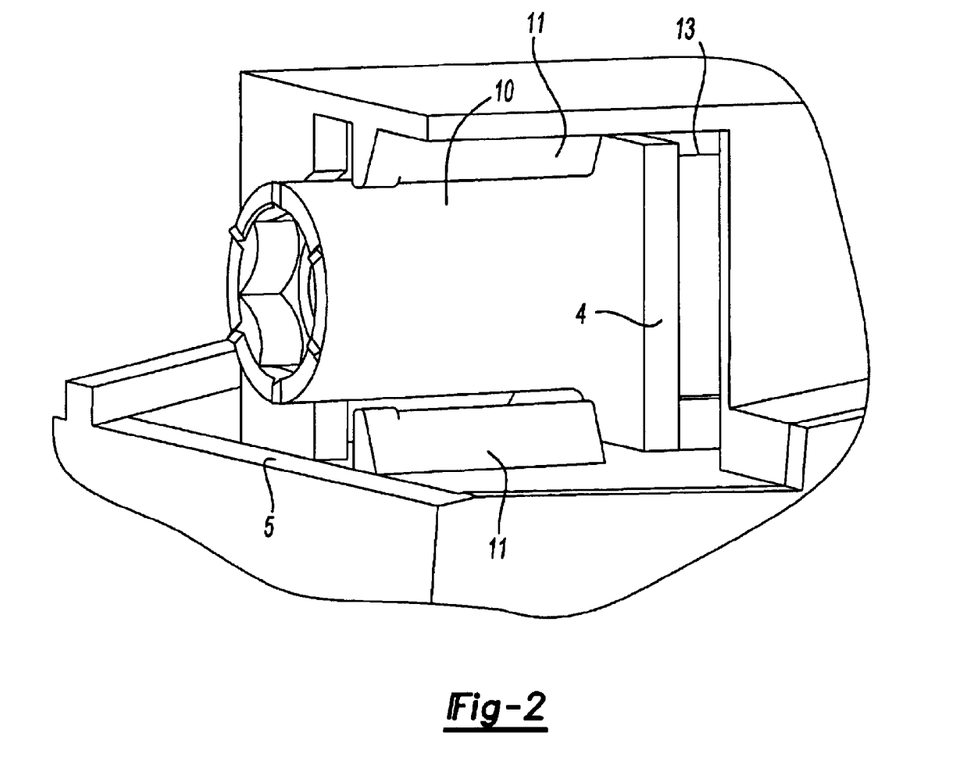
FIG. 2 is an enlarged view of a portion of the profiled member of FIG. 1.

FIG. 2 is an expanded view of the area of the profiled member (1) which contains the cavity means (5) shown in FIG. 1 providing the means for attachment. FIG. 2 shows how the nut (10) may be located within the cavity and also may be held rigidly in place by the surrounding ribs (11) which are part of the rigid member (1). FIG. 2 also shows the square end of the nut (4) which fits the square slot (13) formed in the profiled member (1) in a manner that prevents subsequent rotation of the nut. A door panel may be attached to the pillar that is reinforced with the profiled member (1) by means of a bolt that may be screwed into the nut (10). Accordingly it may be seen that this invention provides great strength and rigidity to the nut (10). The invention therefore allows comparable strength with lighter weight materials.

What is claimed is:

1. A structural reinforcing member comprising:
    a core coated over part of its surface with an expandable material wherein the core is provided with a cavity configured with a nut located therein and the core includes an opening configured to receive a portion of the nut to prevent rotation of the nut;
    wherein the location of the expandable material on the surface of the reinforcing member is such that expansion of the expandable material allows for access to the nut located within the cavity.

2. A structural reinforcing member according to claim 1 in which the reinforcing member is shaped to act as a spacer between metal surfaces defining a cavity to be reinforced upon insertion within the cavity.

3. A structural reinforcing member according to claim 1 in which the cavity which is shaped both to receive a nut and prevent rotation of the nut includes a slot that is one of a square and rectangular.

4. A structural reinforcing member according to claim 1 further comprising a second foamable material, which can be expanded to produce a baffle providing sound insulation.

5. A structural reinforcing member according to claim 4 wherein the member is shaped to conform to a location in the bottom of the A pillar of a vehicle close to the lower door attachment for providing combined reinforcement and insulation effect together with a lighter means of attaching the door to the pillar.

6. A combined structural reinforcement and sound deadening system for a hollow member, comprising:
    a rigid reinforcing member having a shape that substantially conforms to the cross section of a section of the hollow member to be reinforced;
    a first expandable adhesive material over at least a portion of the surface of said rigid reinforcing member, said first expandable material configured for forming a structural foam which, upon expansion, is designed to bond the reinforcing member to at least part of the internal surface of the structure, said rigid reinforcing member having on at least one extremity;
    a second expandable material wherein said second expandable material preferably expands at substantially the same temperature as the first expandable material, and wherein the second expandable material is positioned to allow the second expandable material, upon expansion, to entirely fill the cross section of the hollow member beyond the extremity of the rigid reinforcing member to provide an acoustic baffle;
    wherein the rigid reinforcing member is provided with a cavity with a nut received therein and an opening configured to receive a portion of the nut to prevent rotation of the nut;
    wherein the first and second expandable material are such that when they are foamed, the foam produced allows for access to the nut located within the cavity.

7. A system according to claim 6 wherein the rigid reinforcing member is configured to be bonded at certain positions to the hollow profile member by the structural foam and the sound insulating foam baffle is configured to entirely fill the cross section of the hollow profile member at least one extremity of the rigid reinforcing member and the reinforcing member and the baffle form a unitary structure when placed within the hollow member.

8. A system according to claim 7 wherein the second expandable material is positioned upon the reinforcing member such that, when inserted into the cross section in the unfoamed state, there is a clearance between the perimeter of the second expandable material and the interior walls of the hollow member to allow for passage of an electrocoat fluid.

9. A system according to claim 8 wherein the structural reinforcing member is provided with means for attachment to the interior walls of the frame of the vehicle.

10. A system according to claim 9 wherein the reinforcing member is provided with lugs, which enable it to stand away from the interior walls of the section of the vehicle.

11. A system according to claim 10 wherein the reinforcing member is formed of a material selected from metal or plastic.

12. A system as in claim 11, wherein the reinforcing member is shaped to conform to a location in a pillar of an automobile.

13. A structural reinforcing member comprising:
a core coated over part of its surface with an expandable material wherein the core is provided with a cavity configured with a nut located therein and the core includes an opening configured to receive a portion of the nut to prevent rotation of the nut; and
a second foamable material which can be expanded to produce a baffle providing sound insulation;
wherein the location of the expandable material on the surface of the reinforcing member is such that expansion of the expandable material allows for access to the nut located within the cavity;
wherein the reinforcing member is shaped to act as a spacer between metal surfaces defining a cavity to be reinforced;
wherein the cavity within the reinforcing member that receives the nut is shaped both to receive the nut and prevent rotation of the nut;
wherein the member is shaped to conform to a location in the bottom of the A pillar of a vehicle close to the lower door attachment for providing combined reinforcement and insulation effect together with a lighter means of attaching the door to the pillar.

14. A system as in claim 13, wherein the reinforcing member is shaped to conform to a location within the A pillar of an automobile.

15. A system for reinforcement, sound deadening or both within a hollow area of a structure an automotive vehicle, the system comprising:
a member shaped to conform to the hollow area of the automotive vehicle wherein the member has an opening extending therethrough;
an expandable material adjacent the member wherein, upon insertion within the hollow area:
i. the member and the expandable material, prior to expansion of the expandable material, are configured to provide space to allow electrocoat fluid to pass therethrough; and
ii. the expandable material, upon expansion, is configured to substantially entirely fill a cross-section of the hollow area; and
a bolt extending through the opening of the member, the bolt being fastened to an A-pillar of the automotive vehicles.

16. A system as in claim 15 wherein the hollow area is located adjacent to a location where a door of the vehicle attaches to the vehicle.

17. A system as in claim 16 wherein the expandable material is configured to expand in an e-coat or paint oven.

18. A system as in claim 17 wherein the member is formed of one of thermoplastic and metal.

19. A system as in claim 18 wherein the member includes an attachment means for securing the member in the hollow area.

20. A system as in claim 15 wherein the expandable material is configured to expand at a temperature between 130° C. and about 150° C.

21. A system as in claim 15 wherein the member is formed of a polyamide.

* * * * *